(12) United States Patent
Sterner et al.

(10) Patent No.: US 7,614,230 B2
(45) Date of Patent: Nov. 10, 2009

(54) METHOD AND CONTROL UNIT FOR VARIABLE TURBOCHARGER TURBINE FLOW CROSS-SECTION CONTROL

(75) Inventors: Andreas Sterner, Moeglingen (DE); Matthias Hofstetter, Ringsheim (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 283 days.

(21) Appl. No.: 11/680,268

(22) Filed: Feb. 28, 2007

(65) Prior Publication Data
US 2007/0204617 A1    Sep. 6, 2007

(30) Foreign Application Priority Data
Mar. 1, 2006    (DE)    ............... 10 2006 009 324

(51) Int. Cl.
*F02D 23/00*    (2006.01)

(52) U.S. Cl. ............... 60/602; 60/600; 60/605.1; 60/611

(58) Field of Classification Search ........... 60/600–603, 60/605.1, 611
See application file for complete search history.

(56) References Cited

U.S. PATENT DOCUMENTS 5,083,434 A * 1/1992 Dahlgren et al. ............... 60/602
5,187,935 A * 2/1993 Akiyama et al. ............... 60/602
6,651,430 B2 * 11/2003 Meier et al. ................... 60/602
6,725,660 B2    4/2004 Hidaka

FOREIGN PATENT DOCUMENTS

| DE | 40 05 046 A1 | 9/1990 |
| DE | 100 62 184 C1 | 7/2002 |
| DE | 602 03 692 T2 | 9/2005 |
| EP | 1 323 907 A1 | 7/2003 |
| JP | 2000-282880 A | 10/2000 |
| JP | 2001-173448 A | 6/2001 |
| JP | 2002-155753 A | 5/2002 |
| WO | WO 01/55575 A1 | 8/2001 |

OTHER PUBLICATIONS

"Die Bibliothek der Technik", Band 103, Abgasturbolader, The Library of Technology, vol. 103, Exhaust Gas Turbochargers, Verlag Moderne Industrie, D-86895 Landsberg/Lech, ISBN 3-478-93263-7, pp. 40-41, 2001.

* cited by examiner

*Primary Examiner*—Hoang M Nguyen

(57) ABSTRACT

A method is used for activating an actuator to set a turbine flow cross-section of a motor vehicle turbocharger of a gasoline engine in the event of a change of the load of the engine from a smaller load value to a larger load value. The actuator for the larger load value is activated with a delay in relation to the load change. Furthermore, a control unit set up to control the sequence of the method is used to implement the method.

14 Claims, 4 Drawing Sheets

METHOD AND CONTROL UNIT FOR VARIABLE TURBOCHARGER TURBINE FLOW CROSS-SECTION CONTROL

CROSS REFERENCE TO RELATED APPLICATIONS

This application claims priority to German Patent Application 102006009324.0-13, filed Mar. 1, 2006, the disclosure of which is incorporated by reference herein in its entirety.

BACKGROUND AND SUMMARY OF THE INVENTION

The present invention relates to both a method and a control unit for setting a turbine flow cross-section of the turbocharger in a motor vehicle in the event of a change of the load of the gasoline engine from a smaller load value to a larger load value. Because of the time derivative of the load, which is then positive, such a load change may also be referred to as a positive load change.

Such a method is known from the series "Die Bibliothek der Technik, Band 103, Abgasturbolader [The Library of Technology, Volume 103, Exhaust Gas Turbochargers]", Verlag Moderne Industrie, D-86895 Landsberg/Lech, ISBN 3-478-93263-7, page 40. This literature citation relates to a turbocharger having variable turbine geometry (VTG), in which the turbine flow cross-section is reduced by closing blades to generate a higher pressure gradient between the turbine intake and the turbine outlet. To accelerate out of low speeds, the blades are to be closed in order to obtain the maximum energy from the exhaust gas. Furthermore, the blades open with increasing speed and adapt themselves to the particular operating point.

According to this publication, increasing the torque at low speeds under stationary conditions and tangible improvement of the dynamic driving behavior in passenger automobile diesel engines is particularly to be achieved. The variable turbine geometry particularly contributes to reducing the fundamental delay between an increased torque demand and the provision of the increased torque by the internal combustion engine, known as turbo lag. A use of turbocharger having variable turbine geometry in gasoline engines is also already mentioned in the cited publication.

This turbo lag also represents a challenge for the developers in gasoline engines. Although gasoline engines have been operated up to this point using turbochargers which have fixed turbine geometry because of higher exhaust gas temperatures, one also expects positive effects in principle on the undesired turbo lag effect if turbochargers having variable turbine geometry are used in gasoline engines. The positive effects observed in tests remain, however, behind the expectations.

On this basis, an object of the present invention is to provide a method and a control unit in which an accelerated torque build-up upon a positive load change may be achieved.

This object has been achieved in a method and a control unit according to the present invention by using a control unit and method in which an actuator for setting the turbine flow cross-section to be set for the larger load value is activated with a delay in relation to the change of the load.

It is surprising at first glance that a delayed actuator activation actually accelerates the torque build-up during a positive load change. However, the inventors have recognized that the pressure build-up in the exhaust gas before the turbine, which is desirable per se, may have a counterproductive effect in the event of an undelayed activation of the actuator in a gasoline engine. The reason is that, in contrast to the diesel engine which is typically operated unthrottled, gasoline engines are operated throttled in the part-load range.

The diesel engine operates in part load using excess air. The desired torque is set via the metered fuel quantity. Therefore, it is set via the quality of the combustion chamber charge in the event of essentially identical combustion chamber charge. As a result, the diesel engine delivers a comparatively large exhaust gas mass flow, which keeps the turbine at speed, even in the part-load range, in which it only generates little torque. A closing activation of the blade adjustment then results practically without delay in an increased turbine output, an increased boost pressure, and thus a rapid increase of the combustion chamber charges and the torque of the diesel engine.

In contrast, the power of the gasoline engine is set via the quantity of the mixture combusted in the combustion chamber. At low power, i.e., at low torques and/or speeds, only a correspondingly smaller exhaust gas mass flow also results. In a specific internal combustion engine, the air mass intake per hour varies between 24 kg and 1400 kg depending on load, i.e., by almost two orders of magnitude. In operating states having low exhaust gas mass flows, the turbine speed thus drops comparatively strongly. A closing adjustment of the blades increases the relative proportion of the exhaust gas energy transmitted to the turbine. However, because of the exhaust gas mass flow, which is low in absolute value, a large increase of absolute turbine power is not yet connected thereto. As an undesired result, the boost pressure only rises slowly. In addition, the exhaust gas counterpressure, which arises due to the closing adjustment of the blades, may react on the combustion chambers and obstruct their charge with uncombusted air or uncombusted mixture.

In contrast, the exhaust gas mass flow may first be increased with open throttle valve by the delay of the actuator activation according to the present invention. When the closing adjustment occurs after passage of the short delay time, an increased exhaust gas mass flow is already available, so that the exhaust gas energy transmitted to the turbine is significantly greater than in the event of an undelayed adjustment. As a result, the torque provided by the gasoline engine rises significantly faster than with the undelayed activation. The same advantages result for corresponding embodiments of the control unit.

BRIEF DESCRIPTION OF THE DRAWINGS

Several embodiments of the present invention are described in greater detail on the basis of the drawings, in which.

DETAILED DESCRIPTION OF THE DRAWINGS

Figure 1:
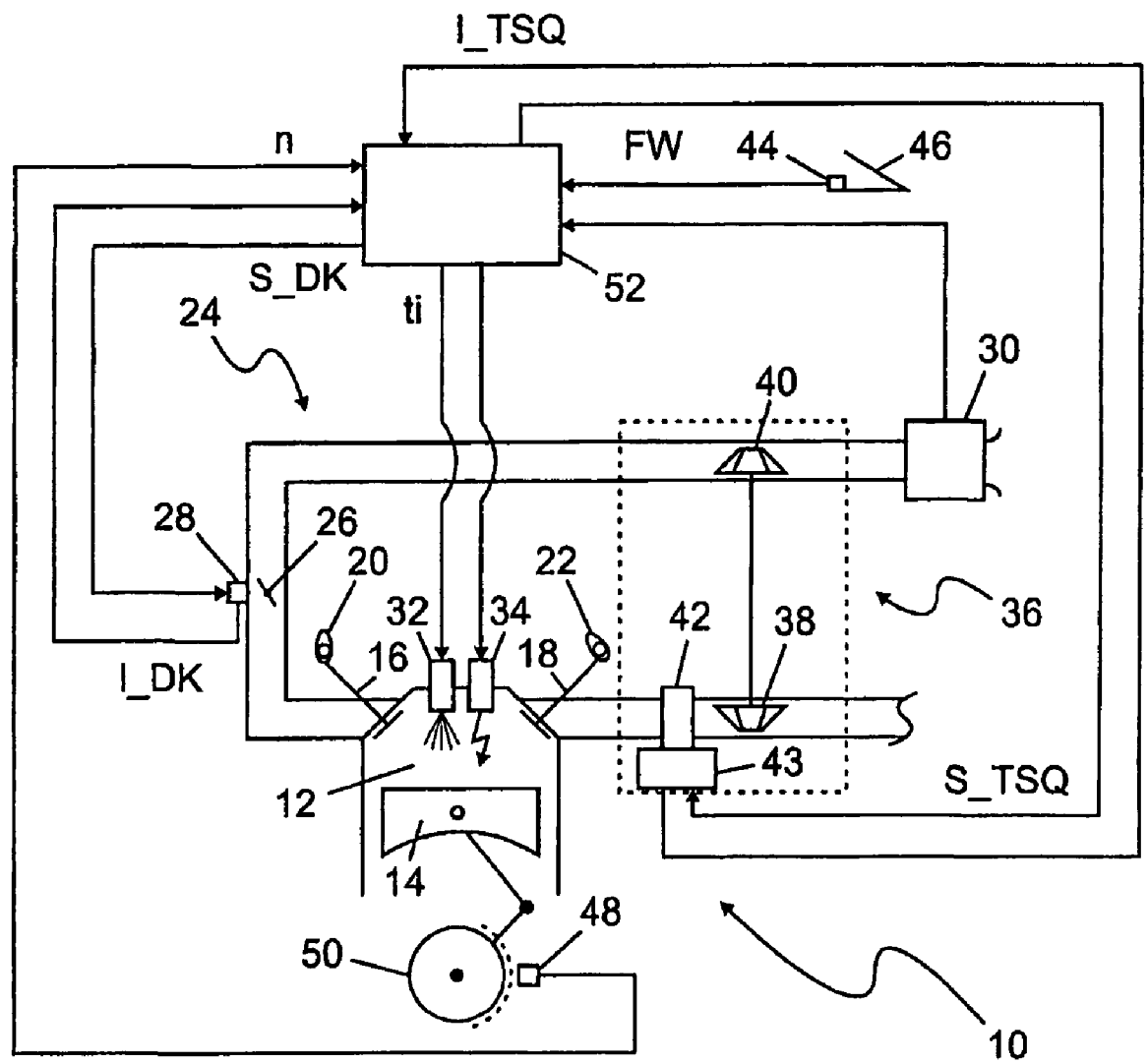
FIG. 1 is a schematic diagram showing an internal combustion engine having a turbocharger with variable turbine geometry.

FIG. 1 shows an internal combustion engine 10 having at least one combustion chamber 12, which is movably sealed by a piston 14. A change of charges of the combustion chamber 12 is controlled via an inlet valve 16 and an exhaust valve 18. The inlet valve 16 is actuated by an inlet valve control element 20 and the exhaust valve 18 is actuated by an exhaust valve control element 22. The inlet valve control element 20 controls the inlet valve 16 in one embodiment using a variable stroke and is thus used as a charge actuator.

When inlet valve 16 is open, air or a mixture of air and fuel flows from an intake system 24 into the combustion chamber 12. The quantity of the inflowing air or the inflowing mixture is set via a throttle valve 26, which is actuated by a throttle valve control element 28, as an alternative or supplement to a variation of the stroke of the inlet valve 16. In any case, the combustion chamber charge is decisively influenced by the pressure before the throttle valve 26 and/or the inlet valve 16 as the particular charge actuator. The throttle valve control element 28 has an integrated throttle valve sensor in one embodiment to provide information I_DK about an actual value of the opening angle of the throttle valve 26.

The combustion chamber charge is preferably determined from the signal of a charge sensor 30, which may be implemented as an air-mass meter or intake manifold pressure sensor. It is contemplated that an intake manifold pressure sensor may also be provided as a supplement to an air-mass meter. The fuel is either metered into the intake system 24 (intake manifold injection) or injected by an injector 32 directly into the combustion chamber 12 (direct injection).

In any case, a combustible combustion chamber charge is produced in the combustion chamber 12, and is ignited by a spark plug 34. Residual gases of the combusted charge of the combustion chamber 12 are expelled via the open exhaust valve 18.

The internal combustion engine 10 illustrated in FIG. 1 has an exhaust gas turbocharger 36, whose turbine wheel 38 is driven by the expelled exhaust gases and in turn drives a compressor wheel 40 in the intake system 24. The exhaust gas turbocharger 36 has an actuator 42 having an electrical drive 43 for controlling the geometry of the turbocharger 36. The electrical drive 43 is typically an electric motor that generates a linear or curved positioning movement in connection with the mechanism of the actuator 42.

Torque demands FW of a driver are detected by a driver command meter 44 that detects the position of an accelerator pedal 46 of the motor vehicle. A rotational angle sensor 48 scans angle markings of an encoder wheel 50 connected rotationally fixed to a crankshaft of the internal combustion engine 10 and thus provides information about the angular position and angular velocity of the crankshaft. The angular velocity is a measure of the speed n of the internal combustion engine 10.

It is apparent to one skilled in the art that multiple further sensors may be provided in modern motor vehicles for controlling and/or regulating the internal combustion engine 10, e.g., to detect pressures, temperatures, angular positions of camshafts, and/or further operating parameters of the internal combustion engine 10. The present invention is therefore not restricted to a use in an internal combustion engine 10 which only has the sensors 28, 30, 44, 48 specified up to this point. Thus, in one embodiment, the electrical actuator 43 may provide information I_TSQ about a set blade position, i.e., position feedback for regulating the blade position in a closed loop or a self-diagnostic result.

To control the internal combustion engine 10, the signals of the integrated throttle valve sensor 28, the charge sensor 30, the driver command meter 44, the rotational angle sensor 48, the optionally provided information I_TSQ, and possibly the signals of alternative or further sensors are processed by an engine control unit 52, which is set up, particularly programmed, to control the sequence of the method according to the present invention and/or one or more of its embodiments. The control unit 52 is distinguished in particular in that it produces actuating signals for controlling functions of the internal combustion engine 10 from the information and signals received. In the embodiment of FIG. 1, these are essentially throttle valve actuating signals S_DK and signals S_TSQ, using which the control unit 52 controls a turbine flow cross-section TSQ, as well as injection pulse widths ti and ignition signals.

Figure 2:
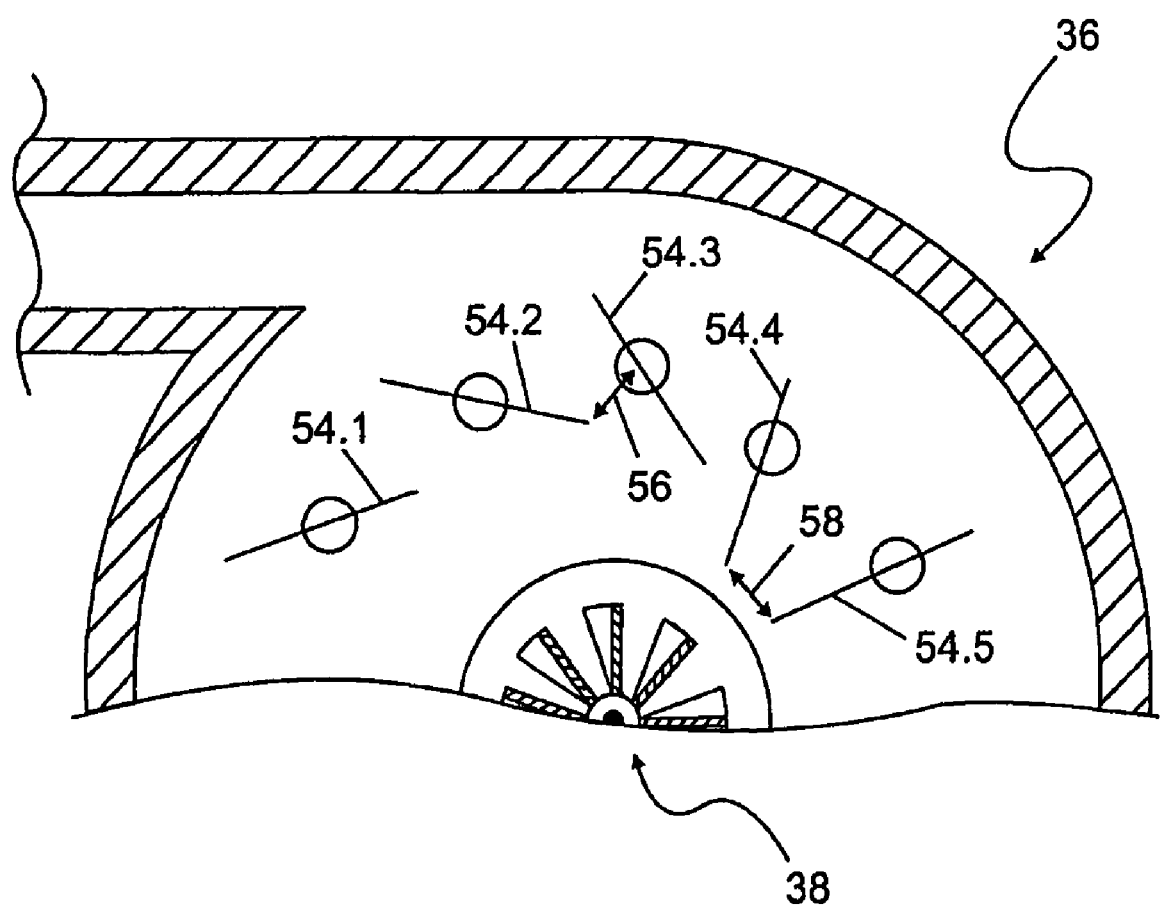
FIG. 2 shows a schematic cross-sectional view showing the variation of the turbine geometry.

FIG. 2 shows an embodiment of a turbine of a turbocharger 36 having annularly situated blades 54.1, 54.2, 54.3, 54.4, and 54.5. Notwithstanding reality, in which all blades 54.1, 54.2, 54.3, 54.4, and 54.5 are set identically, the blades 54.1, 54.2, and 54.3 are shown in a closed position having a smaller flow cross-section 56, and the blades 54.4 and 54.5 are shown in a further open position having a larger flow cross-section 58. The base boost pressure is represented using the larger flow cross-section 58 in this case. The adjustment is performed by the actuator 42, which actuates an adjustment ring connected to the blades via movable levers, for example. Details of the mechanism are not essential for the present invention.

Figure 3A:
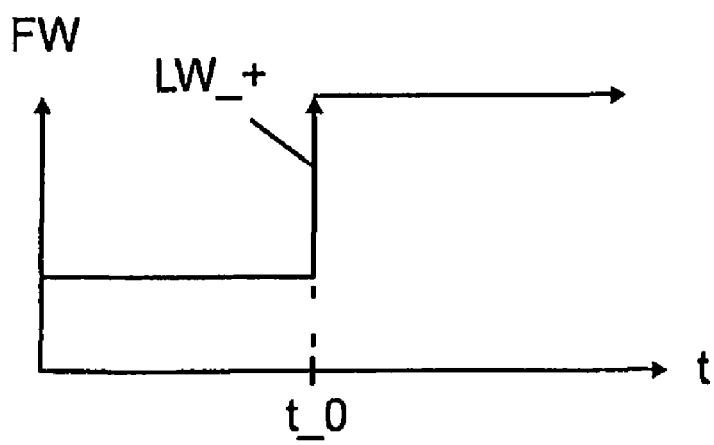
FIGS. 3a-3c are, respectively, time curves of a driver command, a throttle valve adjustment, and an adjustment of a turbine flow cross-section in the event of a positive load change.

FIG. 3 shows time curves of various operating parameters during an execution of an embodiment of the method in qualitative form. Thus, FIG. 3a shows a time curve of a driver command FW in the event of a positive load change LW_+, which occurs at a time t_0. A higher value of FW corresponds to a high desired torque. The control unit 52 processes the signal FW and produces actuating signals S_DK and S_TSQ for generating the desired higher torque.

Figure 3B:
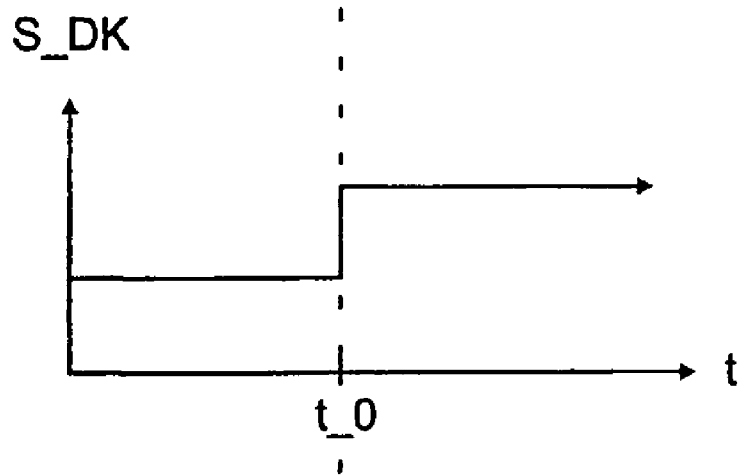

In particular, the throttle valve 26 is rapidly opened to generate a higher torque. This is shown in FIG. 3b by the rise of the actuating signal S_DK directly following the positive load change LW_+, by which the throttle valve is opened further. In an alternative or supplementary control of the combustion chamber charges via a variation of the stroke of the inlet valve 16, the stroke of the inlet valve is accordingly increased.

Figure 3C:
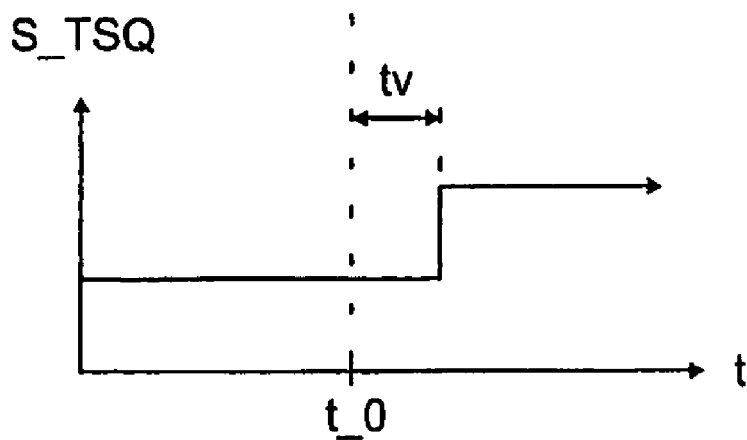

In contrast, the output of the actuating signal S_TSQ, by which the blades are activated to be closed, occurs with a controlled delay in relation to the positive load change LW_+, which is expressed in FIG. 3c by the delay time tv, by which the rise in the actuating signal S_TSQ is delayed in relation to the time t_0. The rise of S_TSQ represents an activation, by which the blades are moved into a further closed position. The activation signal may be a pulse-width-modulated signal, in which the rise of S_TSQ indicates an increase of a sampling ratio. This applies analogously for the actuating signal S_DK of FIG. 3b.

The increase of the exhaust gas mass flow already noted above occurs during this delay time tv. Due to the prior opening of the throttle valve 26 or, more generally, due to prior unthrottling, the pressure rises before the combustion chambers 12. As a desirable result, the sensitivity with which the internal combustion engine 10 reacts to an increased exhaust gas counter pressure also drops.

Figure 4:
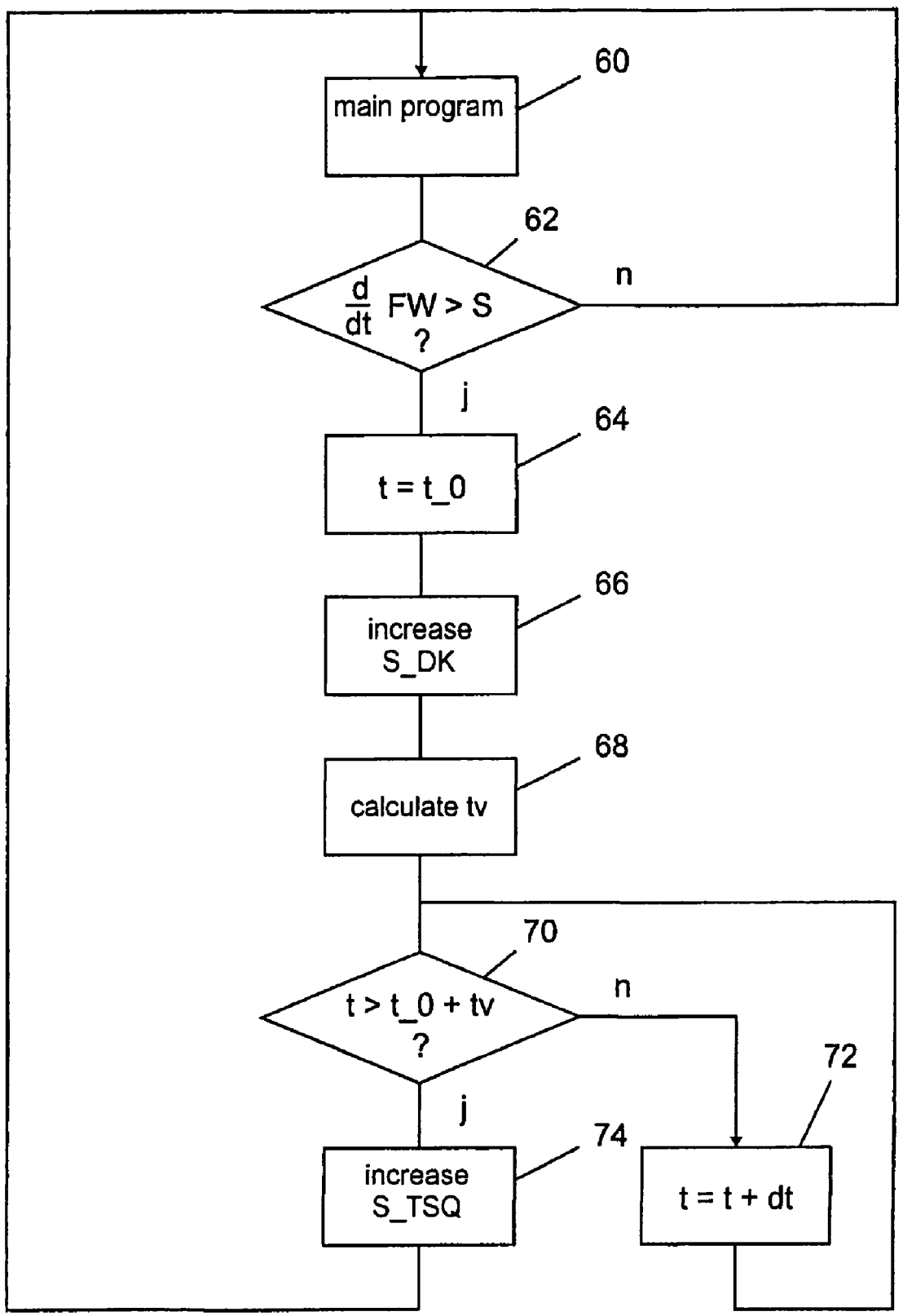
FIG. 4 is a flowchart showing an exemplary embodiment of a method according to the present invention.

FIG. 4 shows an embodiment of a method according to the present invention in the form of a flowchart of a program running in the control unit 52. Step 60 represents a higher-order main program for controlling the internal combustion engine 10. A step 62, in which a demand for a rapid torque increase is recognized, is reached periodically or interrupt-controlled from the main program 60. For this purpose, in the embodiment shown, a change d/dt of the signal FW of the driver command meter 44 is calculated and compared to a threshold value S.

If the FW change is less than S, the program returns to the main program of step 60 without further changes. However, if the threshold value S is exceeded, the program branches into a step 64, in which a timer is set to a numeric value t_0.

Subsequently, the control unit 52 outputs an increased actuating signal S_DK in step 66, by which the throttle valve 26 is opened further. In step 68, a delay time span tv is then established. The delay time span tv typically corresponds to the duration of a few work cycles of the internal combustion engine 10, in which, for example, 2-10 increased combustion chamber charges are expelled. The internal combustion engine 10 is then operated during the delay time span tv using increased signal S_DK, but not yet increased signal S_TSQ.

In step 70, it is checked whether the time t passed since instant t=t_0 exceeds the fixed value for the delay time span tv. As long as this is not the case, a loop of step 70 and a step 72 is run through, in which the value of the time t is successively increased by increments dt. The loop made of steps 70 and 72 is first exited when t exceeds the value tv and a step 74 is reached, in which an altered actuating signal S_TSQ is now also output, by which the turbine flow cross-section TSQ is temporarily reduced to implement the driver command for a rapidly increasing torque.

In the following, further embodiments of the method are presented: the length of the delay time span tv may be predefined as a fixed value in a simple embodiment of step 68. However, it is currently deemed preferable for the extent of the delay, i.e., the length of the time span tv, to be predefined as a function of at least one operating parameter of the internal combustion engine. For this purpose, the speed n of the internal combustion engine during the positive load change LW_+ particularly comes into consideration as the operating parameter. The higher the speed n, the greater the exhaust gas mass flow as a variable, which is proportional to the number of combusted combustion chamber charges produced per unit of time.

For example, in a specific internal combustion engine, a delay time span of 200 ms at n=2000 rpm and a delay time span of 50 ms at n=6000 rpm have been shown to be optimum. In a six-cylinder engine having one turbocharger for each three cylinders, for example, exhaust gases of (50*3*6000)/(1000*60) i.e., of 7 to 8 combustion chamber charges are expelled in the cited 50 ms. In general, the extent of the delay is set to larger values at a smaller value of the speed n than at a larger value of the speed.

However, the exhaust gas mass flow is not only a function of the number of combustion chamber charges per unit of time, but rather also of the extent of the individual combustion chamber charges. In a further currently preferred embodiment, the control unit 52 considers a load of the internal combustion engine before the positive load change LW_+ as a further operating parameter when establishing the value of the delay time span tv in step 68. The extent of the delay tv is set to larger values at a smaller value of the load than at a larger value.

In a further preferred embodiment, after a positive load change LW_+, a dimension for the exhaust gas mass flow is formed by the turbine. The output of the altered actuating signal S_TSQ is omitted in this embodiment until the exhaust gas mass flow exceeds a predetermined threshold value. In other words: step 64 in FIG. 4 is dispensed with. Instead, a threshold value for the exhaust gas mass flow is calculated in step 68 and this value is compared to a current value of the exhaust gas mass flow in step 70, which is repeatedly updated in step 72. The exhaust gas mass flow results, for example, as a variable proportional to the speed and combustion chamber charge.

In a further embodiment, a further operating parameter consisting of a pressure gradient over the throttle valve 26 of the internal combustion engine 10 in the event of a positive load change LW_+ is considered. The extent of the delay, i.e., the size or length of the delay time span tv, is fixed at smaller values in step 68 at a smaller value of the pressure gradient than at a larger value of the pressure gradient.

The pressure gradient may be ascertained by measuring the pressures before and after the throttle valve 26. Alternatively, it may also be ascertained from other measured variables with the aid of a computational model. Thus, for example, a value pair of a measured throttle valve opening angle and a measured intake air mass flow at a specific temperature correlates with a specific value of the pressure gradient.

In a still further embodiment, an exhaust gas temperature is considered as a further operating parameter when establishing the value of the delay time span tv. The exhaust gas temperature may also be measured or modeled. The extent of the delay tv is fixed at a larger value at a smaller value of the exhaust gas temperature than at a larger value of the speed.

In other contemplated embodiments, the operating parameter is an operating parameter dependent on the surroundings of the internal combustion engine. Above all, an air pressure in the surroundings of the internal combustion engine and/or an air temperature in the surroundings of the motor vehicle come into consideration for this purpose. These variables are also accessible both to a model calculation and also measurement with the aid of sensors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an actuator to set a turbine flow cross-section of a motor vehicle gasoline engine turbocharger in the event of a change of gasoline engine load from a smaller load value to a larger load value, the method comprising the steps of:
   operating the actuator to be set for the larger load value with a delay relative to the load change;
   an extent of the delay being predetermined as a function of at least one gasoline engine operating parameter;
   the at least one gasoline engine operating parameter including a gasoline engine speed upon the load change; and
   the extent of the delay being larger at a smaller value of the gasoline engine speed than at a larger value thereof.

2. The method according to claim 1, wherein a further operating parameter is a gasoline engine load before the load change.

3. The method according to claim 1, wherein a further operating parameter is a gasoline engine exhaust gas temperature upon the load change.

4. The method according to claim 3, wherein a further operating parameter is a gasoline load before the load change.

5. The method according to claim 1, wherein the at least one operating parameter includes an operating parameter dependent on gasoline engine surroundings.

6. The method according to claim 5, wherein the at least one operating parameter includes an air pressure in the gasoline engine surroundings.

7. The method according to claim 5, wherein the at least one operating parameter includes air temperature in the surroundings.

8. The method according to claim 7, wherein the at least one operating parameter includes air pressure in the gasoline engine surroundings.

9. A control unit configured to operate an actuator to set a motor vehicle gasoline engine turbocharger turbine flow cross-section in the event of a gasoline engine load change from a smaller load value to a larger load value, comprising:
- means for setting the turbine flow cross-section for the larger load value with a delay relative to the load change;
- an extent of the delay being predetermined as a function of at least one gasoline engine operating parameter;
- said at least one gasoline engine operating parameter includes a gasoline engine speed upon the load change; and
- the extent of the delay being larger at a smaller value of the gasoline engine speed than at a larger value thereof.

10. The control unit according to claim 9, wherein a further operating parameter is a gasoline engine load before the load change.

11. The control unit according to claim 9, wherein a further operating parameter is a gasoline engine exhaust gas temperature upon the load change.

12. The control unit according to claim 9, wherein at least one operating parameter includes an operating parameter dependent on gasoline engine surroundings.

13. The control unit according to claim 12, wherein the at least one operating parameter includes air pressure in the gasoline engine surroundings.

14. The control unit according to claim 12, wherein the at least one operating parameter includes air temperature in the surroundings.

* * * * *